(12) United States Patent
Ehlers

(10) Patent No.: US 7,631,229 B2
(45) Date of Patent: Dec. 8, 2009

(54) SELECTIVE BIT ERROR DETECTION AT A BUS DEVICE

(75) Inventor: Benjamin J. Ehlers, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 449 days.

(21) Appl. No.: 11/410,218

(22) Filed: Apr. 24, 2006

(65) Prior Publication Data

US 2007/0250741 A1     Oct. 25, 2007

(51) Int. Cl.
G06F 11/26     (2006.01)
G06F 11/10     (2006.01)

(52) U.S. Cl. .................................. 714/707; 714/704
(58) Field of Classification Search .................. None
See application file for complete search history.

(56) References Cited

U.S. PATENT DOCUMENTS

| | | | | |
|---|---|---|---|---|
| 4,646,312 A | * | 2/1987 | Goldsbury et al. | 714/763 |
| 4,683,566 A | * | 7/1987 | Sasaki | 370/225 |
| 4,995,041 A | * | 2/1991 | Hetherington et al. | 714/763 |
| 5,867,541 A | * | 2/1999 | Tanaka et al. | 375/354 |
| 5,982,294 A | * | 11/1999 | Takayama et al. | 340/7.44 |
| 7,346,819 B2 | * | 3/2008 | Bansal et al. | 714/726 |

OTHER PUBLICATIONS

LIN Local Interconnect Network; "LIN Specification Package Revision 2.0"; Sep. 23, 2003; pp. 1-19; LIN Consortium.
LIN Local Interconnect Network; "LIN Protocol Specification Revision 2.0"; Sep. 23, 2003; pp. 1-23; LIN Consortium.
LIN Local Interconnect Network; "LIN Diagnostic and Configuration Specification Revision 2.0"; Sep. 23, 2003; pp. 1-16; LIN Consortium.
LIN Local Interconnect Network; "LIN Physical Layer Specification Revision 2.0"; Sep. 23, 2003; pp. 1-12; LIN Consortium.
LIN Local Interconnect Network; "LIN Application Program Interface Specification Revision 2.0"; Sep. 23, 2003; pp. 1-28; LIN Consortium.
LIN Local Interconnect Network; "LIN Node Capability Language Specification Revision 2.0"; Sep. 23, 2003; pp. 1-11; LIN Consortium.
LIN Local Interconnect Network; "LIN Configuration Language Specification Revision 2.0"; Sep. 23, 2003; pp. 1-16; LIN Consortium.

(Continued)

*Primary Examiner*—Kevin L Ellis
*Assistant Examiner*—Dipakkumar Gandhi

(57) ABSTRACT

In one aspect, a data transmission rate of a message signal representing a bus message at a bus and a propagation delay between an occurrence of the message signal at a transmission output to the bus and an occurrence of the message signal at a receive input from the bus are determined. Bit error detection is selectively disabled responsive to a compatibility between the data transmission rate and the propagation delay. In another aspect, a bus line interface includes a transmit output and a receive input coupled to a bus line, a bit error detection module and a data rate module. The bus line interface also includes a bit error control module to selectively disable the bit error detection module based on a propagation delay between a signal and a reflected signal and based on a data transmission rate of the signal.

19 Claims, 5 Drawing Sheets

OTHER PUBLICATIONS

"Slave LIN Interface Controller (SLIC) Module"; Freescale Semiconductor; 2005.

Atmel; "AVR308: Software LIN Slave"; Rev. 1637-AVR-05/02; Amtel Corporation; 2002; pp. 1-12.

Fosler, Ross; "AN239 Bit Banged LIN Slave Node for PIC16 & PIC18"; Microchip Technology Inc.; 2002; pp. 1-22.

Sparks, Kim; "VPW J1850 Multiplexing Controller (BDLC) Module"; AN1731; Freescale Semiconductor, Inc.; 2004; pp. 1-36.

* cited by examiner

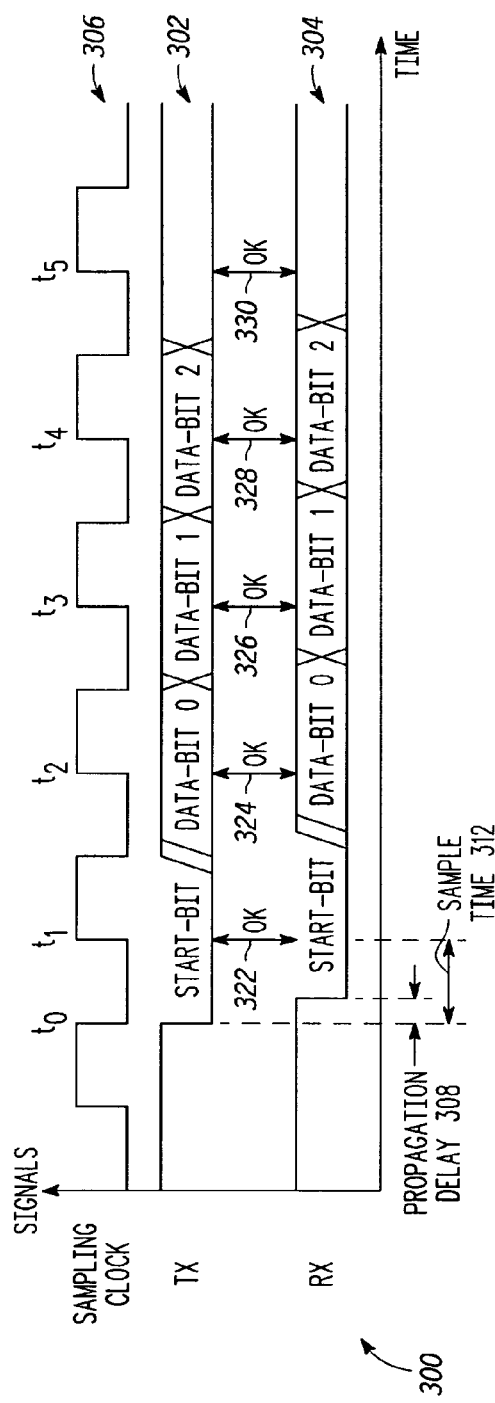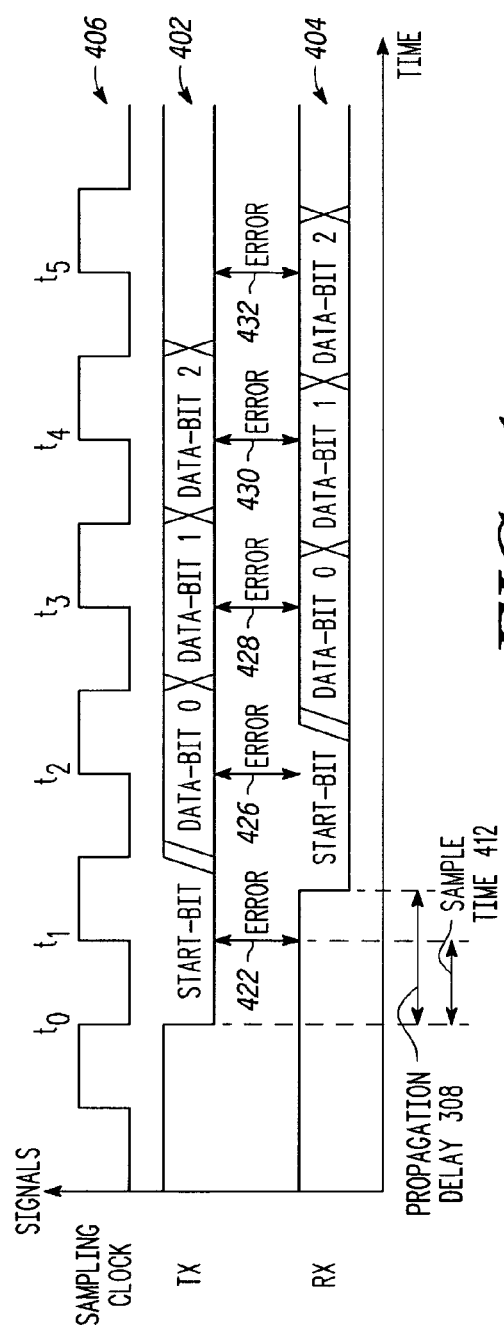

SELECTIVE BIT ERROR DETECTION AT A BUS DEVICE

FIELD OF THE DISCLOSURE

The present disclosure relates generally to bus messaging and more particularly to bit error correction for bus transactions.

BACKGROUND

A number of bus connectivity protocols, such as the local interconnect network (LIN) protocols, utilize bit error detection. To illustrate, the LIN protocols provide that each bus device reflects the signal from its transmit output to its receive input, where bit errors are detected by simultaneously sampling the signal and its reflected version and comparing the samples to confirm whether there is a match. If the samples do not match, a bit error is signaled.

This bit error detection scheme typically is sufficient when the data transmission rate (e.g., the baud rate) is within a specified range. However, in many instances it may be advantageous to operate a transmission rate higher than the specified range. At these higher transmission rates, the propagation delay between the signal at the transmitter and the reflected signal may be greater than the sampling period, thereby resulting in misleading bit errors using the sampling technique described above. Conventional systems often attempt to overcome this problem by disabling bit error detection when the data transmission rate is greater than a defined transmission threshold. However, these conventional systems require that the bus devices receive explicit notification that the data transmission rate is going to exceed the defined transmission threshold, usually by transmitting an additional bus transaction prior to the high-speed bus transaction or by requiring additional side signals to write a register at each bus device. The need for explicit notification of a high-speed bus transaction therefore slows down the effective bandwidth of the bus as additional signaling is required or adds additional complexity for purposes of the side signaling. Accordingly, an improved technique for disabling bit error detection at higher transmission rates would be advantageous.

BRIEF DESCRIPTION OF THE DRAWINGS

The present disclosure may be better understood, and its numerous features and advantages made apparent to those skilled in the art by referencing the accompanying drawings.

FIG. 3 is a timing diagram illustrating a signal at a transmit output of a bus device and the reflected representation of the signal at a receive input of the bus device for bit error detection purposes in accordance with at least one embodiment of the present disclosure.

FIG. 4 is a timing diagram illustrating a signal at a transmit output of a bus device and a reflected representation of the signal at a receive input of the bus device for a transmission rate greater than a predefined transmission threshold in accordance with at least one embodiment of the present disclosure.

The use of the same reference symbols in different drawings indicates similar or identical items.

DETAILED DESCRIPTION

Figure 1:
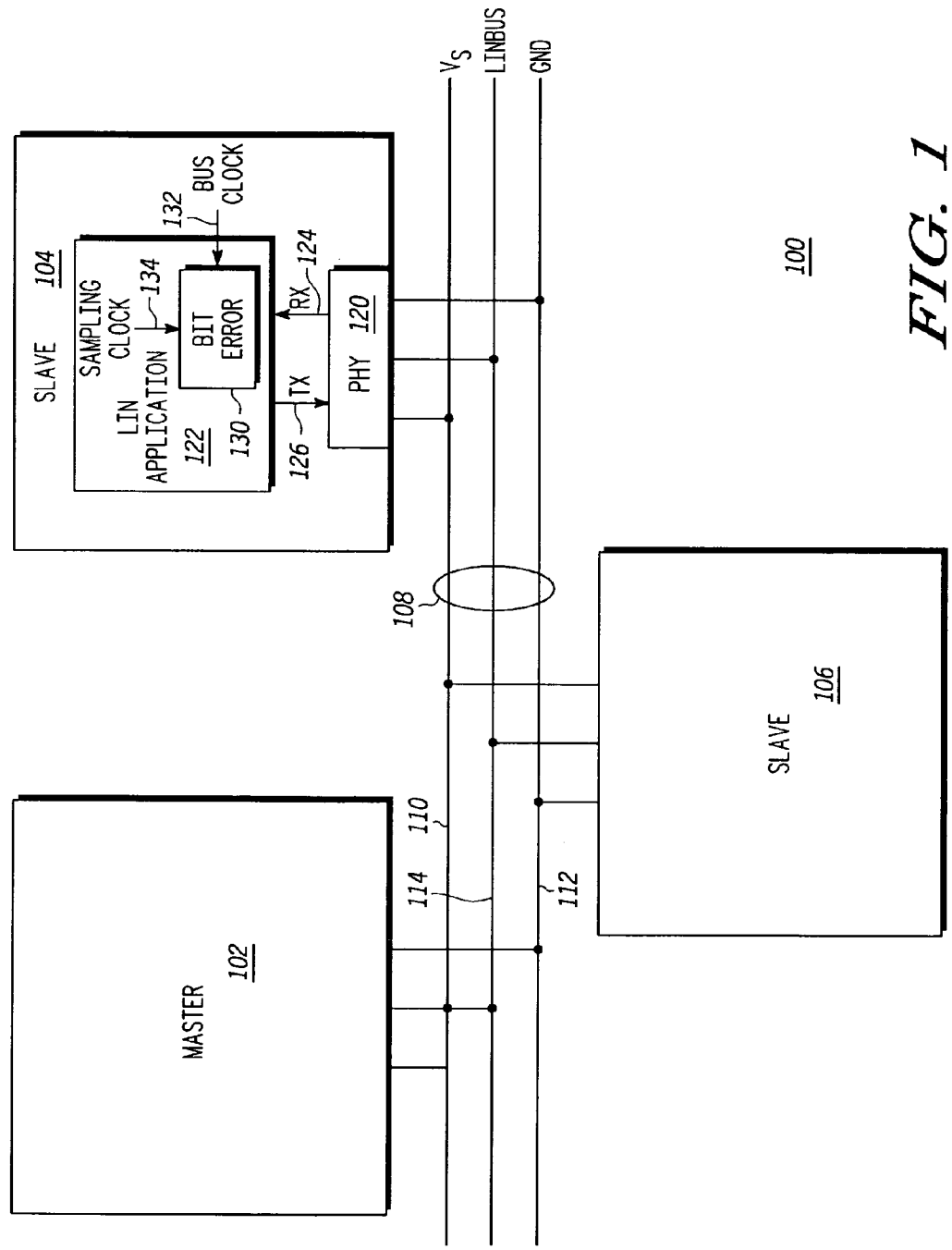
FIG. 1 is a block diagram illustrating an exemplary system utilizing automatic transmission rate detection for disabling bit error detection in accordance with at least one embodiment of the present disclosure.

In accordance with one aspect of the present disclosure, a method comprises determining a data transmission rate of a message signal representing a bus message at a bus and determining a propagation delay between an occurrence of the message signal at a transmission output to the bus and an occurrence of the message signal at a receive input from the bus. The method further includes selectively disabling bit error detection responsive to a compatibility between the data transmission rate and the propagation delay.

In accordance with another aspect of the present disclosure, a method includes receiving, at a bus line interface of a device, a message signal representing a message header having a synchronization field, wherein the synchronization field is representative of a data transmission speed of the message signal. The method further includes determining a first value based on the synchronization field, wherein the first value is representative of a data transmission rate of the message signal. The method additionally includes determining a second value based on a number of clock cycles between an occurrence of an edge event in a first representation of the message signal present at a transmit output of the bus line interface and the occurrence of the edge event in a second representation of the message signal present at a receive input of the bus line interface. The second value is representative of a propagation delay between the transmit output and the receive input. The method further includes selectively disabling bit error detection at the device based on a comparison of the first value to the second value.

In accordance with yet another aspect of the present disclosure, a device includes a bus line interface having a transmit output connected to a bus line and a receive input connected to the bus line, wherein a signal at the transmit output occurs at the receive input as a reflected signal. The device further includes a bit error detection module connected to the bit error control module and the bus line interface and a data rate module connected to the bus line interface, the data rate module to determine a data transmission rate of the signal based on a synchronization field of the signal. The device additionally includes a bit error control module connected to the bus line interface and the data rate module. The bit error control module to selectively disable the bit error detection module based on a propagation delay between the signal and the reflected signal and based on the data transmission rate.

FIGS. 1-7 illustrate exemplary techniques for selectively disabling bit error detection at a bus device. In at least one embodiment, a bus device determines the data transmission rate of a received bus message using, for example, a synchronization field of the bus message. The bus device also propagates (or "reflects") the signal representing the received bus message between its transmit output and its receive input of its bus line interface. The bus device then determines a propagation delay between the transmit output and the receive input and compares the propagation delay to the determined transmission rate. The bus device selectively enables or disables bit error detection at the bus device based on the comparison. In one embodiment, bit error detection is disabled when the determined transmission rate is incompatible with the determined propagation delay.

For purposes of the present disclosure, a data transmission rate of a bus message is incompatible with the propagation delay of a bus line interface when the propagation delay is greater than a predetermined portion (including the entirety) of a period of a sampling clock signal used to sample a signal and its reflected representation, where the frequency of the sampling clock signal, and thus the period, is based on (e.g., proportional) to the data transmission rate. Conversely, the data transmission rate of a bus message is compatible when the propagation delay is less than the predetermined portion of the period of the sampling clock signal. In some implementations, the data transmission rate can be considered to be compatible with the propagation delay when the propagation delay is equal to the predetermined portion of the period of the sampling clock signal, whereas in other implementations the data transmission can be considered to be incompatible with the propagation delay when the propagation delay and the predetermined portion of the period of the sampling clock signal are equal.

For ease of illustration, the exemplary techniques are described in the context of a bus substantially compliant with a local interconnect network (LIN) protocol, including LIN rev. 1.2, LIN rev. 1.3 and LIN rev. 2.0 as promulgated by the LIN Consortium, in an automotive vehicle context. However, those skilled in the art, using the guidelines described herein, can utilize these exemplary techniques in other contexts and using other bus protocols utilizing bit error detection based on sample comparison of a reflected signal without departing from the scope of the present disclosure.

Referring to FIG. 1, an exemplary system 100 utilizing selectively disabled bit error detection is illustrated in accordance with at least one embodiment of the present disclosure. The system 100 includes bus devices 102, 104 and 106 coupled via a bus 108. In the depicted example, the bus device 102 is a master device (hereinafter, master device 102) and the bus devices 104 and 106 are slave devices (hereinafter, slave device 104 and slave device 106, respectively). In at least one embodiment, the system 100 can be implemented in an automobile. Accordingly, examples of the master device 102 in this context can include a central processing unit (CPU) or other centralized controller, a memory management unit, and the like. Examples of the slave devices 104 and 106 in this context can include automotive components, such as wiper controllers, power seat controllers, climate controllers, and the like.

In one embodiment, the bus 108 is substantially compliant with the LIN protocol. Accordingly, the bus 108 includes a voltage supply ($V_S$) line 110 (typically connected to the vehicle's positive battery terminal), a ground (GND) line 112 (typically connected to the vehicle's chassis), and a single data line 114 (LINBUS) used to transmit data.

In the illustrated example, the slave device 104 includes a bus line interface 120 (herein referred to as the physical (PHY) interface 120) and a LIN application module 122. The PHY interface 120 includes hardware configured to connect to the data line 114 and includes a receive input 124 and a transmit output 126. Further, in compliance with the LIN protocol, the PHY interface 120 is configured so that when the slave device 104 is the only device actively driving data on the single data line 114, the signal at the transmit output 126 is propagated (i.e., reflected) to the receive input 124. The slave device 106 is similarly configured.

The LIN application module 122 utilizes the receive input 124 and the transmit output 126 to receive and transmit data, respectively, on the data line 114 via the PHY interface 120. The LIN application module 122 may be implemented as hardware, firmware, software, or a combination thereof. To illustrate, in one embodiment, the LIN application module 122 is implemented, in whole or in part, as executable instructions to manipulate a processor to perform the functions described herein. In an alternate embodiment, the LIN application module 122 is implemented, in whole or in part, as one or more hardware logic-based state machines.

The LIN application module 122 further includes a bit error module 130 to perform bit error detection by sampling a signal at the transmit output 126 and its corresponding reflected representation at the receive input 124. Further, as described in greater detail with reference to FIGS. 2-7, the bit error module 130 can detect the data transmission rate of a received bus message using a bus clock signal 132 and generate a sampling clock signal 134 based on the data transmission rate, where the sampling clock signal 134 is used for bit error detection purposes. Further, the bit error module 130 determines a propagation delay between the transmit output and the receive input 124 and selectively disables bit error detection in response to an incompatibility between the detected transmission rate and the propagation delay.

Figure 2:
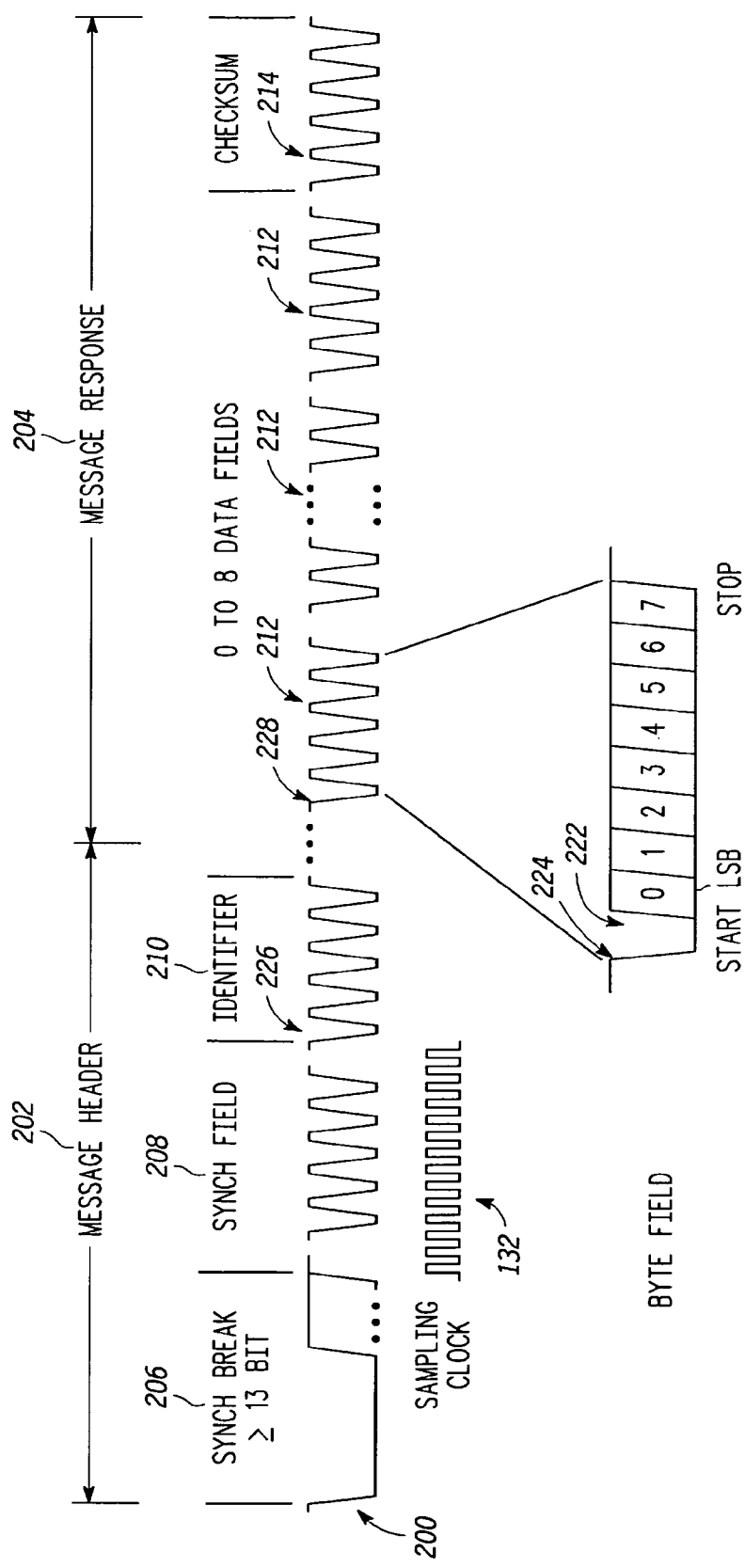
FIG. 2 is a diagram illustrating an exemplary bus message format in accordance with at least one embodiment of the present disclosure.

Referring to FIG. 2, an exemplary LIN bus message format used for transmission rate detection and transmit/receive propagation delay detection is illustrated in accordance with at least one embodiment of the present disclosure. In the depicted example, the bus message 200 includes a message header 202 and a message response 204. The message header 202 includes a synchronization break field 206 used to identify the start of the bus message 200, a synchronization field 208 (also referred to as a synch-5-5 field) used to synchronize the bus clock signal 132 of the bus device to frequency of the bus message 200 and an identifier field 210 to provide an identifier used to indicate which bus devices are permitted to transmit and which bus devices are to receive in the message response 204. The message response 204 typically includes up to eight data fields 212 and a checksum field 214.

For each bus message 200, the master device 102 (FIG. 1) generates the message header 202 based on certain parameters, such as the data transmission rate to be used for the data fields 212 of the message response 204 and the bus devices to be involved during the transmission of the bus message 200. As part of the message header 202, the master device 102 sets the identifier field 210, thereby indicating which slave devices are to transmit or receive during the message response 204. To illustrate, the identifier field 208 may be an eight-bit field (two bits of which are parity bits), thereby allowing sixty-four different identifier values. Each identifier value may be used to indicate the particular transactions for the message response 204. For example, the identifier value of six (6) can indicate that the slave device 104 (FIG. 1) is to transmit data at the first data field 212 and the slave device 106 is to be the recipient of this data, while the identifier value of eight (8) can be used to indicate that the master device 102 will be providing data for each of the data fields 212 and that both the slave device 104 and the slave device 106 are to be the recipients of all of this data.

During receipt of the message header 202, the slave device 104 utilizes the synchronization field 208 to determine the bit rate of the following message response 204. The synchronization field 208 typically is implemented as a known byte value (usually 0x55). Accordingly, the slave device 104 can utilize the bus clock signal 132 to determine the number of cycles of the bus clock signal 132 between corresponding edge events (e.g., falling edges or rising edges) of the synchronization field 208, where the bit rate (i.e., the data transmission rate) is inversely proportional to the number of bus clock cycles between the corresponding edge events.

As described in detail with reference to FIGS. 3 and 4, the slave device 104 implements a bit error detection process whereby the signal output by the transmit output 126 (FIG. 1) and its reflected representation are concurrently sampled based on the sampling clock signal 134 (FIG. 1) and the corresponding sampled values are compared to detect a mismatch between concurrently sampled values. In one embodiment, the frequency of the sampling clock signal 134, and thus its period, is based on the determined bit rate. To illustrate, in an effort to sample each data bit of the message response in the middle of the data bit position and thereby reducing errors due to setup and hold times, frequency of the sampling clock signal 134 representing the sample period can be configured to be one-half of the detected bit rate (i.e., one-half of the frequency). In other implementations, the sampling clock signal 134 can be configured to be a different fraction of the detected bit rate.

As noted above, a propagation delay typically is introduced between the occurrence of the signal at the transmit output 126 and its reflected representation at the receive input 124 due to the physical characteristics of the PHY interface 120 (FIG. 1). To determine this propagation delay, the slave device 104, in one embodiment, uses the bus clock signal 132 or another clock to measure the number of clock cycles between the occurrence of an edge event in the signal at the transmit output 126 and the occurrence of the same edge event in the reflected representation at the receive input 124. To illustrate, the LIN protocol provides that the byte fields of the bus message 200, such as the identifier field 210, the data fields 212, and the checksum field 214, utilize a start bit 222 initiated by a falling edge 224. Accordingly, in at least one embodiment, the falling edge preceding a start bit of a byte field of the bus message 200 is utilized as the edge event for determining the propagation delay. Thus, edge events usable by the slave device 104 for determining the propagation delay can include falling edge 226 of the identifier 210 or the falling edge 228 of one of the data fields 212.

Referring to FIGS. 3 and 4, timing diagrams illustrating the use of the determined sample period for bit error detection at the slave device 104 (FIG. 1) is illustrated in accordance with at least one embodiment of the present disclosure. FIG. 3 illustrates a timing diagram 300 whereby the data transmission rate is compatible with the propagation delay of the PHY interface 120 (FIG. 1). The timing diagram 300 includes transmit (TX) signal 302 representing the transmission of a signal at the transmit output 126 (FIG. 1), a receive (RX) signal 304 representing the reflected representation of the TX signal 302 after propagating from the transmit output 126 to the receive input 124 (FIG. 1), and a sampling clock signal 306 representative of the sampling clock signal 134 (FIG. 1) used to time the sampling of the TX signal 302 and the RX signal 304. The propagation delay between the TX signal 302 and the RX signal 304 is represented as the propagation delay 308 and the sample time between the falling edge of the start bit of the TX signal 302 at time $t_0$ and the first sampling event (e.g., the first rising edge) of the sampling clock signal 306 is illustrated as the sample time 312.

In the example of FIG. 3, the data transmission rate of the signal is compatible with the propagation delay 308 (i.e., the sample time 312 is greater than the propagation delay 308). Accordingly, the bit error module 130 (FIG. 1) enables bit error detection. At each sampling event (e.g., the rising edges at times $t_1, t_2, t_3, t_4$, etc.) of the sampling clock signal 306, the TX signal 302 and the RX signal 304 are sampled and the sampled values are compared (as represented by comparison events 322, 324, 326, 328 and 330). Thus, unless there is an error in transmission, the sampled bit value of the TX signal 302 should match the corresponding sampled bit value of the RX signal 304 because the time shift between the TX signal 302 and the RX signal 304 due to the propagation delay is compatible with the sample time 312 (i.e., the sample time 312 is greater than the propagation delay 308).

FIG. 4 illustrates a timing diagram 400 whereby the data transmission rate is incompatible with the propagation delay of the PHY interface 120 (FIG. 1). The timing diagram 400 includes transmit (TX) signal 402 representing the transmission of a signal at the transmit output 126 (FIG. 1), a receive (RX) signal 404 representing the reflected representation of the TX signal 402 after propagating from the transmit output 126 to the receive input 124 (FIG. 1), and a sampling clock signal 406 representative of the sampling clock signal 134 used to time the sampling of the TX signal 402 and the RX signal 404. In this example, assume that the data transmission rate as indicated by the synchronization field 208 (FIG. 2) of the corresponding bus message is significantly higher than the data transmission rate of the corresponding bus message of FIG. 3. To illustrate, the bus message represented in FIG. 3 could include, for example, a bus message transmitted at less than the maximum baud rate of 19k as provided by the LIN protocol, whereas the bus message represented in FIG. 4 could include, for example, a bus message transmitted at a transmission rate greater than the maximum baud rate of 19k. Accordingly, sampling clock signal 406 has a higher frequency than the sampling clock signal 306 of FIG. 3 and thus the sample time 412 between the falling edge of the start bit of the TX signal 402 at time to and the first sampling event (e.g., the first rising edge) of the sampling clock signal 406 at time $t_1$ is proportionately less than the sample time 312 of FIG. 3. Further, in the example of FIG. 4, it is assumed that the propagation delay of the PHY interface 120 is substantially independent of the data transmission rate the propagation delay between the TX signal 402 and the RX signal 404 therefore is represented as the same propagation delay 308 as in FIG. 3.

Assuming that bit error detection were enabled, at each sampling event (e.g., the rising edges at times $t_1, t_2, t_3, t_4$, etc.) of the sampling clock signal 406, the TX signal 402 and the RX signal 404 would be sampled and the sampled values compared (as represented by comparison events 422, 424, 426, 430 and 432). However, unlike the situation of FIG. 3, the sampled bit value of the TX signal 402 would not match the corresponding sampled bit value of the RX signal 404 except for instances where the same bit value is repeated in the signal because the time shift between the TX signal 402 and the RX signal 404 due to the propagation delay 308 is incompatible with the sample time 312 (i.e., the sample time 312 is less than or equal to the propagation delay 308). To illustrate, at time $t_2$, the value at bit position 1 of the TX signal 402 is sample, whereas the value at bit position 0 of the RX signal 404 is sampled, rather than the bit position 1 of the RX signal 404. Spurious bit error detection events therefore would be generated even though the PHY interface 120 likely is operating properly. Accordingly, in at least one embodiment, the slave device 104 disables bit error detection when the data transmission rate is determined to be incompatible with the propagation delay of the PHY interface 120, thereby reducing or eliminating spurious bit error detection events.

Figure 5:
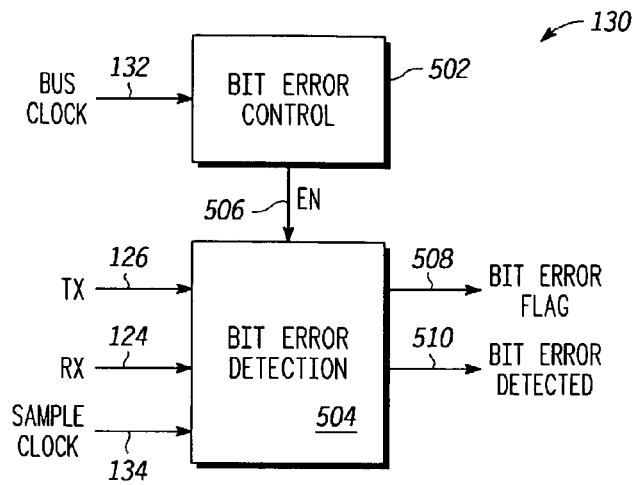
FIG. 5 is a block diagram illustrating a bit error detection component of a bus device in accordance with at least one embodiment of the present disclosure.

Referring to FIG. 5, an exemplary implementation of the bit error module 130 of FIG. 1 is illustrated in accordance with at least one embodiment of the present disclosure. The bit error module 130 includes a bit error control module 502 having an input to receive bus messages via the bus 108 (FIG. 1)(not shown), an input to receive the bus clock signal 132, and an output to provide an enable (EN) signal 506. The bit error module 130 further includes a bit error detection module 504 having an input coupled to the output of the bit error control module 502 to receive the EN signal 506, an input coupled to the transmit output 126 (FIG. 1), an input coupled to the receive input 124, and an input to receive the sampling clock signal 134. The bit error detection module 504 further includes an output to provide a bit error flag signal 508 and a bit error detected signal 510. The components of the bit error module 130 may be implemented as hardware, firmware, software, or a combination thereof. To illustrate, the bit error control module 502 and the bit error detection module 504 may be implemented, in whole or in part, as software routines executed at a microprocessor of the slave device 102. In this instance, the EN signal 506, the bit error flag signal 508 and the bit error detected signal 510 may be represented as values written to one or more control registers, for example. As another example, the bit error control module 502 and the bit error detection module 504 may be implemented as hardware-based logic, or as a combination of hardware logic and software.

In one embodiment, the bit error control module 502 determines a first value representative of the data transmission rate of a received bus message using, for example, the synchronization field 208 (FIG. 2) and the bus clock signal 132 as described above. Further, the bit error control module 502 determines a second value representative the propagation delay between a signal at the transmit output 126 and its reflected representation at the receive input 124. Based on a comparison of the first value and the second value, the bit error control module 502 determines whether the data transmission rate and the propagation delay are sufficiently compatible. If determined to be compatible, the bit error control module 502 asserts the EN signal 506. Otherwise, if determined to be incompatible, the bit error control module 502 deasserts the EN signal 506.

The bit error detection module 502 periodically compares the signal at the transmit output 126 with the signal at the receive input 124, where the sampling period is controlled by the sampling clock signal 134. In the event that there is a mismatch between corresponding sampled bit values and in the event that the EN signal 506 is asserted, the bit error detection module 504 asserts the bit error detected signal 510 to indicate that there is a bit error in the transmission of the signal. Further, if the EN signal is asserted, the bit error detection module 504 deasserts the bit error flag signal 508 to indicate that bit error detection is enabled. Otherwise, in the event that the EN signal 506 is unasserted, the bit error detection module 504 maintains the bit error detected signal 510 as unasserted and asserts the bit error flag signal 508 regardless of whether a mismatch is detected while comparing corresponding sampled bit values.

Figure 6:
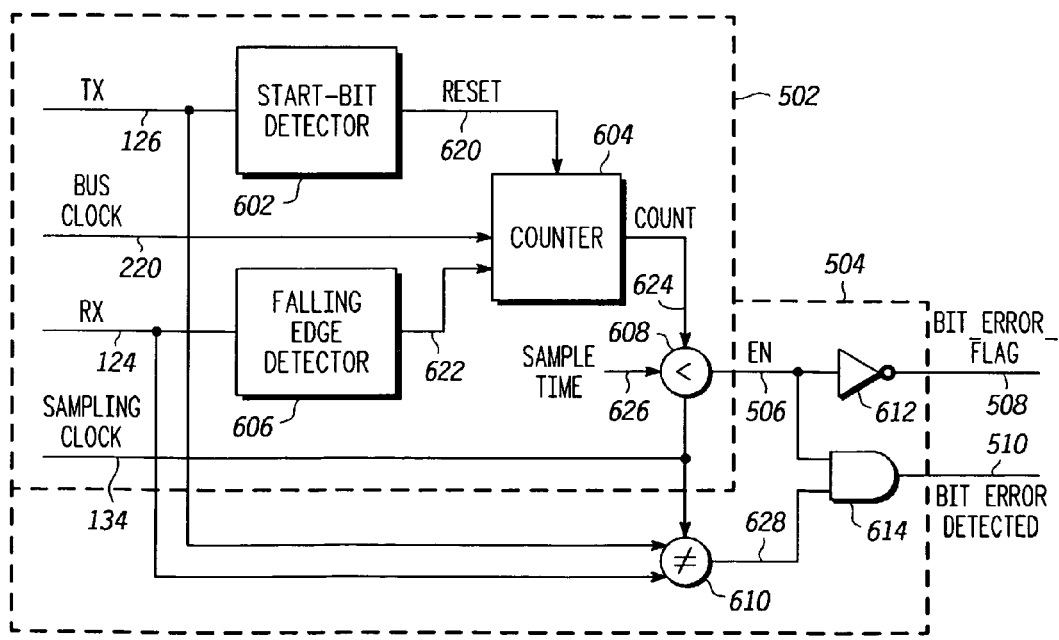
FIG. 6 is a block diagram illustrating a functional representation of the bit error detection component of FIG. 5 in accordance with at least one embodiment of the present disclosure.

Referring to FIG. 6, an exemplary functional implementation of the bit error module 130 of FIG. 5 is illustrated in accordance with at least one embodiment of the present disclosure. In the depicted example, the bit error control module 502 includes a start-bit detector 602, a counter 604, a falling edge detector 606 and a comparator 608. The bit error detection module 508 includes a comparator 610, an inverter 612, and an AND gate 614. It will be appreciated that the illustrated elements of FIG. 6 can represent software-implemented functions, hardware-implemented functions, or combinations thereof. To illustrate, the comparators 608 and 610 can be implemented as software compare routines or as hardware-based comparators, and the inverter 612 and the AND gate 614 can be implemented as combinatorial logic hardware or as software routines that perform an inversion logic function and an AND logic function, respectively.

The start-bit detector 602 includes an input connected to the transmit output 126 and an output to assert a reset signal 620 in response to the detection of a start bit of a byte field of a bus message represented by a signal at the transmit output 126. As noted above, the start bit of a data field can be determined by detecting a falling edge in the signal following the synchronization field 208 (FIG. 2) or the identifier field 210 (FIG. 2) of the bus message header. The falling edge detector 606 includes an input connected to the receive input 124 and an output to assert (e.g., as a pulse) a falling edge signal 622 in response to detecting a falling edge in the reflected signal at the receive input 124.

The counter 604 includes an input to receive the bus clock signal 132, an input to receive the reset signal 620 and an input to receive the falling edge signal 622. The counter 604 further includes an output to provide a count value 624 representing the number of clock cycles that occur in the bus clock signal 132 between when the reset signal 620 is asserted and when the falling edge signal 622 is asserted. Thus, as the reset signal 620 is asserted by the start-bit detector 602 in response to a falling edge of the signal and the falling edge signal 622 is subsequently asserted in response to the same falling edge in the reflected signal, the number of clock cycles in the bus clock signal 132 between the occurrence of the falling edge in the signal and the occurrence of the same falling edge in the reflected signal (i.e., the count value 624) is representative of the propagation delay between the transmit output 126 and the receive input 124.

The comparator 608 includes an input to receive the count value 624, an input to receive the sampling clock signal 134, and an input to receive a sample time 626 of the signal determined based on the synchronization field 208 (FIG. 2) of the signal as described above. The comparator 608 further includes an output to assert the EN signal 506 in response to the count value 624 being less than the sample time 626 (i.e., the data transmission rate is compatible with the propagation delay) and in response to a sample edge event (e.g., a rising edge) of the sampling clock signal 134. Conversely, the comparator 608 deasserts the EN signal 506 in response to the count value 624 being equal to or greater than the sample time 626 (i.e., the data transmission rate is incompatible with the propagation delay).

The comparator 610 of the bit error detection module 504 includes a first input coupled to the transmit output 126, a second input coupled to the receive input 124 and a third input to receive the sampling clock signal 134. The comparator 610 samples a value at each of the first input and the second input responsive to an edge event (e.g., a rising edge) of the sampling clock signal 134. The comparator 610 further includes an output to provide a mismatch signal 628 that is unasserted when the two sampled values substantially match and asserted when the two sampled values do not substantially match.

The inverter 612 includes an input to receive the EN signal 506 and an output to provide an inverted representation of the EN signal 506 as the bit error flag signal 508. Thus, when bit error detection is enabled on the basis of an asserted EN signal 506, the bit error flag signal 612 is unasserted, and vice versa.

The AND gate 614 includes an input to receive the EN signal 506, an input to receive the mismatch signal 628, and an output to provide the bit error detected signal 510 responsive to a logical AND operation on the EN signal 506 and the match signal 628. Thus, if bit error detection is enabled on the basis of the asserted EN signal 506, the bit error detected signal 510 will be asserted by the AND gate 614 when the mismatch signal 628 is asserted by the comparator 610, thereby indicating that the sampled value of the signal and the sampled value of the reflected signal do not match. In the event that bit error detection is disabled on the basis of the unasserted EN signal 506, the bit error detected signal 510 is unasserted by the AND gate 614 regardless of whether the mismatch signal 628 indicates that the corresponding sampled values match.

Figure 7:
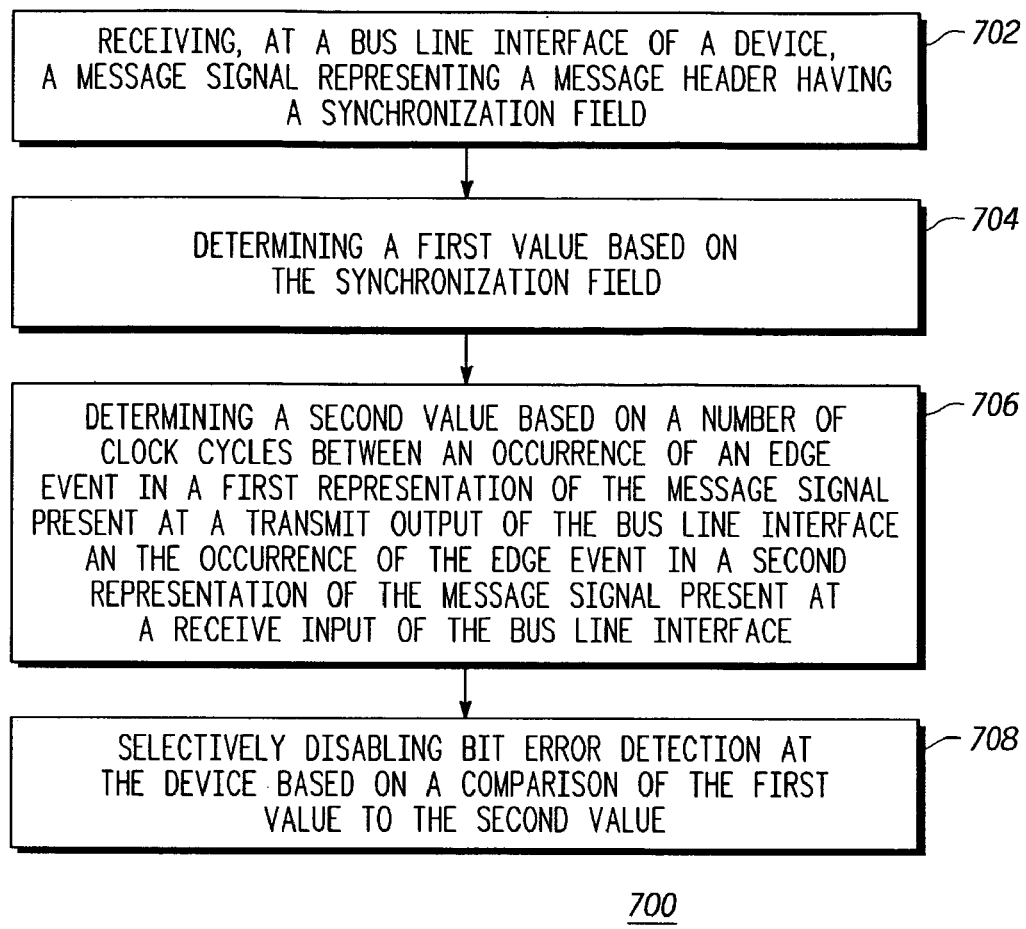
FIG. 7 is a flow diagram illustrating an exemplary method for selectively disabling bit error detection at a bus device in accordance with at least one embodiment of the present disclosure.

Referring to FIG. 7, an exemplary method 700 for selectively disabling bit error detection in a bus device is illustrated in accordance with at least one embodiment of the present disclosure. At block 702, the method 700 includes receiving, at a bus line interface of a device, a signal representing a message header having a synchronization field. The message header can include, for example, the message header of a bus message based on the LIN protocol. At block 704, the method 700 includes determining a first value based on the synchronization field. In one embodiment, the synchronization field is representative of a data transmission rate of the signal and the first value therefore is representative the data transmission rate. As described above, the first value can be determined based on the number of clock cycles of a clock that occur between corresponding edges of the synchronization field.

At block 706, the method 700 includes determining a second value based on a number of clock cycles between an occurrence of an edge event in a first representation of the signal present at a transmit output of the bus line interface and an occurrence of the edge event in a second representation of the signal present at a receive input of the bus line interface. The second representation of the signal, in one embodiment, includes a reflected representation of the first representation of the signal. The second value therefore is representative of a propagation delay between the transmit output and the receive input. In one embodiment, the second value is determined by determining a number of clock cycles of the clock between the occurrence of the edge event in the first representation of the signal and the occurrence of the edge even in the second representation of the signal, wherein the second value is based on the number of cycles.

At block 708, the method 700 further includes selectively disabling bit error detection at the device based on a comparison of the first value to the second value. In one embodiment, bit error detection is enabled at the device responsive to the comparison of the first value to the second value indicating that the propagation delay is compatible with the data transmission rate. Conversely, bit error detection is disabled at the device responsive to the comparison of the first value to the second value indicating that the propagation delay is incompatible with the data transmission rate.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    determining, at a bit error module of a device coupled to a bus, a data transmission rate of a message signal representing a bus message;
    determining, at the bit error module, a propagation delay between an occurrence of the message signal at a transmission output to the bus and an occurrence of the message signal at a receive input from the bus; and
    selectively disabling bit error detection at the device responsive to a comparison of the data transmission rate to the propagation delay.

2. The method of claim 1, wherein determining the data transmission rate of the message signal comprises determining a number of cycles of a clock signal between a first edge event and a second edge event of a synchronization field of the bus message, wherein the number of cycles is representative of the data transmission rate.

3. The method of claim 1, wherein determining the propagation delay comprises determining a number of cycles of a clock signal between an occurrence of an edge event of the message signal at the transmission output and an occurrence of the edge event of the message signal at the receive input.

4. The method of claim 1, wherein bit error detection comprises:
    concurrently sampling, based on a sampling clock signal, the message signal at the transmission output to provide a first sample value and the message signal at the receive input to provide a second sample value, wherein a period of the sampling clock signal is based on the data transmission rate; and
    determining a bit error based on a comparison of the first value to the second value, wherein a mismatch between the first value and the second value indicates a bit error.

5. The method of claim 4, wherein selectively disabling bit error detection comprises:
    enabling bit error detection when the propagation delay is less than a portion of the period of the sampling clock signal; and
    disabling bit error detection when the propagation delay is greater than the portion of the period of the sampling clock signal.

6. A method comprising:
    receiving, at a bus line interface of a device, a message signal representing a message header having a synchronization field, wherein the synchronization field is representative of a data transmission rate of the message signal;
    determining a first value based on the synchronization field, wherein the first value is representative of the data transmission rate of the message signal;
    determining a second value based on a number of clock cycles between an occurrence of an edge event in a first representation of the message signal present at a transmit output of the bus line interface and the occurrence of the edge event in a second representation of the message signal present at a receive input of the bus line interface, wherein the second value is representative of a propagation delay between the transmit output and the receive input; and
    selectively disabling bit error detection at the device based on a comparison of the first value to the second value.

7. The method of claim 6, wherein selectively disabling bit error detection comprises:
    enabling bit error detection at the device responsive to the comparison of the first value to the second value indicating that the propagation delay is compatible with the data transmission rate; and
    disabling bit error detection at the device responsive to the comparison of the first value to the second value indicating that the propagation delay is incompatible with the data transmission rate.

8. The method of claim 6, further comprising:
    comparing each value of a first sequence of values sampled at the transmit output with the corresponding value of a second sequence of values sampled at the receive input, wherein a sampling frequency of the transmit output and the receive input is based on the data transmission rate; and providing an asserted bit error signal responsive to a substantial mismatch between a value of the first sequence of value and the corresponding value of the second sequence and responsive to bit error detection being enabled.

9. The method of claim 8, further comprising:

providing an unasserted bit error signal responsive to bit error detection being disabled.

10. The method of claim 6, wherein:

determining the first value comprises determining a first number of cycles of a clock between edge events of the synchronization field, wherein the first value is based on the first number of cycles; and determining the second value comprises determining a second number of cycles of the clock between the occurrence of the edge event in the first representation of the message signal and the occurrence of the edge event in the second representation of the message signal, wherein the second value is based on the second number of cycles.

11. The method of claim 6, wherein the bus is compliant with a Local Interconnect Network (LIN) standard.

12. A device comprising:

a bus line interface having a transmit output coupled to a bus line and a receive input coupled to the bus line, wherein a signal at the transmit output occurs at the receive input as a reflected signal;

a bit error detection module coupled to the bus line interface;

a data rate module coupled to the bus line interface, the data rate module to determine a data transmission rate of the signal based on a synchronization field of the signal; and a bit error control module coupled to the bus line interface, the bit error detection module, and the data rate module, the bit error control module to selectively disable the bit error detection module based on a propagation delay between the signal and the reflected signal and based on the data transmission rate.

13. The device of claim 12, wherein the bus line comprises a single bus line.

14. The device of claim 13, wherein the bus line is compliant with a Local Interconnect Network (LIN) standard.

15. The device of claim 12, wherein the bit error control module is configured to:

enable the bit error detection module responsive to the propagation delay being compatible with the data transmission rate; and disable the bit error detection module responsive to the propagation delay being incompatible with the data transmission rate.

16. The device of claim 12, wherein the bit error detection module is configured to:

compare each value of a first sequence of values sampled at the transmit output with the corresponding value of a second sequence of values sampled at the receive input, wherein a sampling frequency of the transmit output and the receive input is based on the data transmission rate; and provide an asserted bit error signal responsive to a substantial mismatch between a value of the first sequence of value and the corresponding value of the second sequence and responsive to the bit error detection module being enabled.

17. The device of claim 12, wherein the bit error detection module is configured to:

provide an unasserted bit error signal responsive to the bit error detection module being disabled.

18. The device of claim 12, wherein the bit error control module is configured to:

determine a first number of cycles of a clock between edge events of the synchronization field, wherein the data transmission rate is determined based on the first number of cycles.

19. The device of claim 18, wherein the bit error control module is configured to:

determine a second number of cycles of the clock between the occurrence of an edge event in the signal and the occurrence of the edge event in the reflected signal, wherein the propagation delay is determined based on the second number of cycles.

* * * * *